UNITED STATES PATENT OFFICE.

EMIL R. VON PORTHEIM, OF PRAGUE, AUSTRIA.

MANUFACTURE OF SIZE.

SPECIFICATION forming part of Letters Patent No. 241,897, dated May 24, 1881.

Application filed October 26, 1880. (No specimens.)

*To all whom it may concern:*

Be it known that I, EMIL RITTER VON PORTHEIM, residing at Prague, in the Empire of Austria, and a subject of the Emperor of Austria, have invented a process for making soluble neutral to weakly alkaline proteinous substances which coagulate only in the heat, and, as they are employed mainly in calico-printing, of proteinous substances which have other qualities, of which the following is a specification.

This invention relates to a process for rendering insoluble proteinous substances soluble and neutral or weakly alkaline, so that they will coagulate only in heat, and made applicable mainly in calico-printing.

The proteinous materials to be treated by my process are fibrine, flesh, caseine, gluten, and albumen of eggs or blood which has become insoluble or coagulated. One hundred grains of the above-mentioned materials are first dried and ground, together with about four grains of a solution of alkali, and after adding a little water the solution is effected by gentle heating. If the solution should be alkaline it is neutralized by adding sufficient muriatic acid. With caseine the heat should reach the boiling-point. With albumen which has become insoluble, and also with caseine, a solution of chloride of calcium is added under heat, so as to first obtain complete coagulation. Afterward the alkali is added without boiling. Gluten is cleaned by allowing it to stand and liquefy. Soda is then added to precipitate it, and the sediment is then washed and dissolved in alkali. The solutions thus made are then evaporated and dried in usual manner of treating egg-albumen. Before using these substances in the art of printing on cloth, it is advisable to add about four grains of chloride of calcium, or equivalent quantities of any soluble salt of calcium, barium, strontium, or magnesium.

By the above process proteinous substances are rendered neutral to weakly alkaline, coagulate only in heat, and are rendered useful in calico-printing.

I do not broadly claim the treatment of caseine or the like with alkali, as stated in patent No. 223,459; nor do I claim precipitating gluten held in solution by neutralizing the solution with acid, nor, broadly, the treatment of gluten mixed with albumen with an alkali.

I claim—

The process herein described of treating insoluble or coagulated proteinous substances by first drying them, then mixing them with an alkaline solution and grinding the mixture, then heating, and finally neutralizing the mixture by adding muriatic acid, substantially as specified.

In testimony whereof I have signed my name to this specification in the presence of two subscribing witnesses.

EMIL RITTER V. PORTHEIM.

Witnesses:
JOHANN BARTA,
EDW. CASPAR RUTY.